(12) United States Patent
Bachrany et al.

(10) Patent No.: US 9,003,080 B2
(45) Date of Patent: Apr. 7, 2015

(54) MANAGED ACCESS TO PERIPHERALS OF A SERVICE TERMINAL

(71) Applicant: International Business Machines Corporation, Armonk, NY (US)

(72) Inventors: Vlamir Bachrany, Sao Paulo (BR); Fernando Antonio Camargo, Sao Paulo (BR); Marcelo Claudio de Souza Melo, Sao Paulo (BR); Igor Reis dos Santos, Valinhos (BR)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 13/627,161

(22) Filed: Sep. 26, 2012

(65) Prior Publication Data

US 2014/0089538 A1   Mar. 27, 2014

(51) Int. Cl.
*G06F 3/00*   (2006.01)
*G06F 9/455*   (2006.01)

(52) U.S. Cl.
CPC .............. *G06F 3/00* (2013.01); *G06F 9/45533* (2013.01)

(58) Field of Classification Search
CPC .............................. G06F 3/00; G06F 9/45533
USPC ........................................... 713/100; 710/37
See application file for complete search history.

(56) References Cited

U.S. PATENT DOCUMENTS

| | | | |
|---|---|---|---|
| 6,199,160 B1 * | 3/2001 | Echensperger et al. | 713/100 |
| 6,604,157 B1 * | 8/2003 | Brusky et al. | 710/65 |
| 7,272,570 B2 | 9/2007 | Sadler | |
| 7,519,653 B1 | 4/2009 | Coutts et al. | |
| 7,529,868 B2 | 5/2009 | Brooks et al. | |
| 8,027,847 B1 | 9/2011 | Francis et al. | |
| 2002/0099634 A1 * | 7/2002 | Coutts et al. | 705/35 |
| 2007/0016481 A1 | 1/2007 | Morrison | |
| 2009/0299800 A1 | 12/2009 | Neilan | |
| 2012/0030379 A1 | 2/2012 | Won et al. | |

FOREIGN PATENT DOCUMENTS

| | | | |
|---|---|---|---|
| EP | 0953947 A2 | 11/1999 | |
| EP | 1081664 B1 | 3/2007 | |

* cited by examiner

*Primary Examiner* — Ernest Unelus
(74) *Attorney, Agent, or Firm* — Ronald A. Kaschak, Esq.; Matthew M. Hulihan, Esq.; Heslin Rothenberg Farley & Mesiti P.C.

(57) ABSTRACT

Managed access to one or more peripherals of a service terminal is provided. A master controller controls access to the peripheral(s) by applications of the service terminal, wherein only a single application can access the peripheral(s) at a time, by identifying an application of the applications for placing into an on-focus state in order to enable access to the peripheral(s) by the identified application, and placing the identified application into the on-focus state, where access to the peripheral(s) by the identified application is enabled. The remaining applications of the applications execute in an off-focus state in which the master controller simulates, for the remaining applications, connectivity to the peripheral(s), and in which access to the peripheral(s) by the remaining applications is disabled transparent to the remaining applications while the access to the peripheral(s) by the identified application is enabled.

18 Claims, 5 Drawing Sheets

MANAGED ACCESS TO PERIPHERALS OF A SERVICE TERMINAL

BACKGROUND

It is sometimes desired to execute many separate applications on a single data processing system. If the separate applications are designed to execute in disparate data processing environments (hardware architecture, operating system, etc.), and in particular for those applications that are designed to execute in a data processing environment different from that provided by the data processing system on which the applications are to run, virtualization is sometimes used. Virtualization is accomplished by a host data processing system executing software that virtualizes a data processing environment in which an application is designed to run. Virtualization can offer a reliable method for executing many individual applications—requiring possibly different execution environments—within a single data processing system. However, virtualization techniques are not easily applied to some types of data processing systems, and in particular service terminals such as 'self-service' type interactive kiosks.

BRIEF SUMMARY

Shortcomings of the prior art are overcome and additional advantages are provided through the provision of a method for managing access to one or more peripherals of a service terminal. The method includes, for instance, controlling, by a master controller executing on at least one processor of the service terminal, access to the one or more peripherals by multiple applications of the service terminal, wherein only a single application of the multiple applications is enabled access to the one or more peripherals at a time, and wherein the controlling includes: identifying an application of the multiple applications for placing into an on-focus state in order to enable access to the one or more peripherals by the identified application; placing the identified application into the on-focus state, wherein access to the one or more peripherals by the identified application is enabled; and wherein the remaining applications of the multiple applications execute in an off-focus state in which the master controller simulates, for the remaining applications, connectivity to the one or more peripherals, and in which access to the one or more peripherals by the remaining applications is disabled transparent to the remaining applications while the access to the one or more peripherals by the identified application is enabled.

Further, a computer system is provided which includes a memory; one or more peripherals; and a processor in communications with the memory. The computer system is configured to perform controlling, by a master controller executing on the processor, access to the one or more peripherals by multiple applications of the computer system, wherein only a single application of the multiple applications is enabled access to the one or more peripherals at a time, and wherein the controlling includes, for instance: identifying an application of the multiple applications for placing into an on-focus state in order to enable access to the one or more peripherals by the identified application; placing the identified application into the on-focus state, wherein access to the one or more peripherals by the identified application is enabled; and wherein the remaining applications of the multiple applications execute in an off-focus state in which the master controller simulates, for the remaining applications, connectivity to the one or more peripherals, and in which access to the one or more peripherals by the remaining applications is disabled transparent to the remaining applications while the access to the one or more peripherals by the identified application is enabled.

Additionally, a computer program product is provided for managing access to one or more peripherals of a service terminal. The computer program product includes a tangible storage medium readable by a processor and storing instructions for execution by the processor to perform a method which includes, for instance, controlling, by a master controller, access to the one or more peripherals by multiple applications of a service terminal, wherein only a single application of the multiple applications is enabled access to the one or more peripherals at a time, and wherein the controlling includes, for instance: identifying an application of the multiple applications for placing into an on-focus state in order to enable access to the one or more peripherals by the identified application; placing the identified application into the on-focus state, wherein access to the one or more peripherals by the identified application is enabled; and wherein the remaining applications of the multiple applications execute in an off-focus state in which the master controller simulates, for the remaining applications, connectivity to the one or more peripherals, and in which access to the one or more peripherals by the remaining applications is disabled transparent to the remaining applications while the access to the one or more peripherals by the identified application is enabled.

Additional features and advantages are realized through the concepts of one or more aspects of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
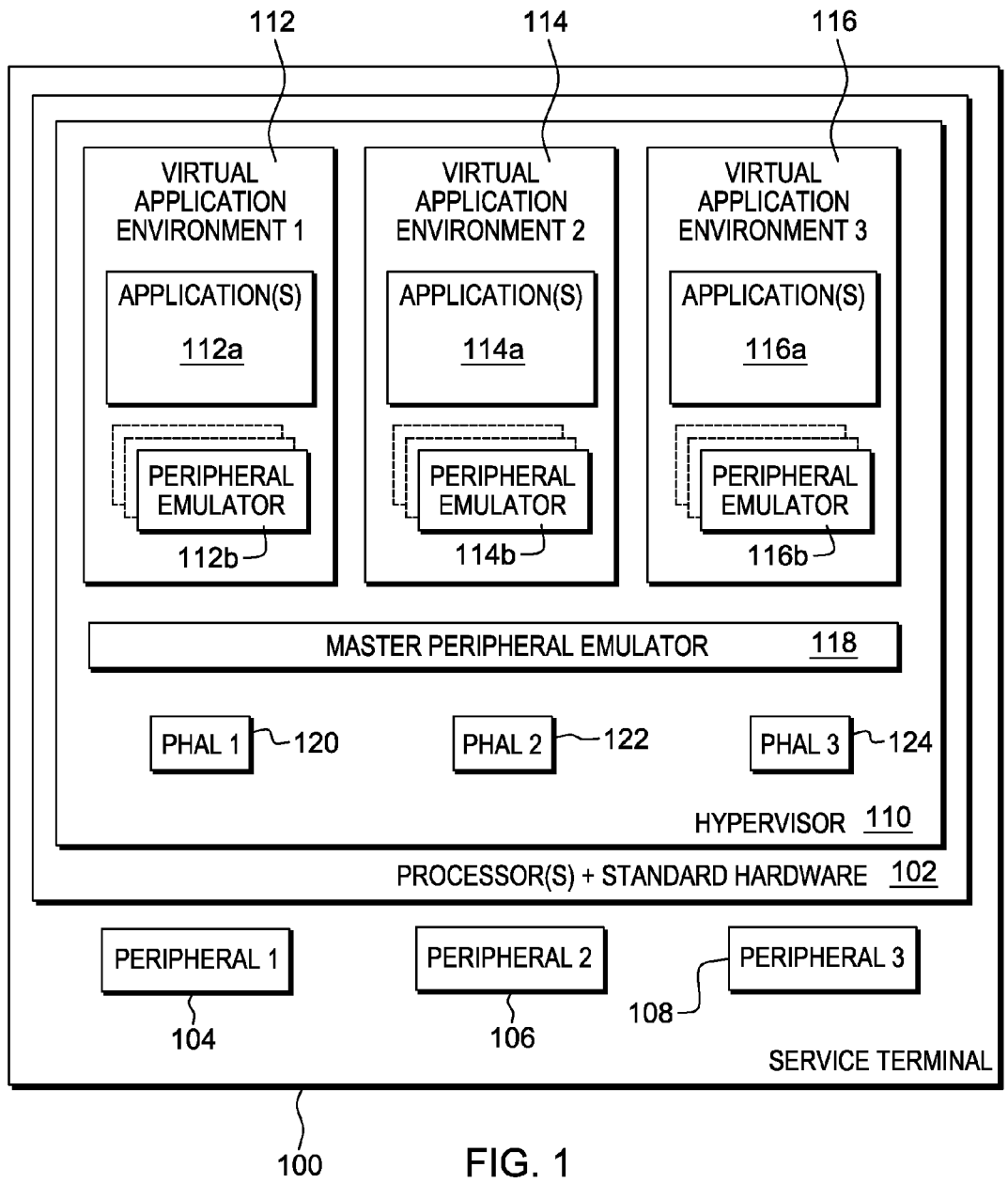
FIG. 1 depicts one example of a service terminal in accordance with one or more aspects of the present invention.

Described herein is managed access to one or more peripherals of a service terminal. A service terminal is a customer-operated data processing system having specialized hardware and software for the customer to perform application-specific tasks. Service terminals of this type are referred to using a variety of different names including "self-service terminals", "common use self service", and "interactive kiosks". They are used for a wide variety of applications in various industries. Examples include: the transportation industry (airline, rental vehicle, commuter train) for ticket printing and customer registration/check-in, the entertainment industry (amusement parks, concerts, and movie theaters) for ticket printing, the media industry (for movie and game rentals at DVD and game rental kiosks), the financial industry for automated teller machines, and the technology industry for telephone or internet kiosks, as well as various other specialized applications such as customer self-checkout stations in supermarkets and other retails stores.

Special design considerations apply to service terminals in order to maximize reliability, uptime, and usability across a variety of end-users. Terminal design, hardware component reliability, software resilience, and graphical user interface usability (large buttons, support for multiple languages, etc), are examples of critical design aspects. Additionally, some peripheral devices used in service terminals are highly specialized pieces of hardware that must reliably perform simple operation(s) repeatedly, sometimes hundreds of thousands of times for the device's useful life. Typical peripherals of this type are referred to herein as 'off-the-shelf peripherals' or just 'peripherals', and include, but are not limited to, a pinpad, coin hopper, biometric reader (fingerprint, palm vein, or retina scanners for instance), currency acceptor and cash dispenser, card reader, barcode and image scanner, cryptographic keyboard, thermal printer, and an alarm system with logging, for instance an alarm system that detects intrusion of the equipment, producing an alarm if the equipment security has been violated.

A user of the service terminal interacts with a user interface of the terminal, usually a graphical user interface, to accomplish various tasks. An example of a task performed at an automated teller machine (ATM) is the task of withdrawing money. Each task is usually associated with a corresponding application for performing that task. Thus, the ATM might include an application that, when activated, causes a cash dispenser to output a particular amount of cash to the user, while another application of the ATM is responsible for activating a deposit slot to physically accept from the user checks or cash that is to be deposited. In this manner, the actions by one or more peripheral devices (cash dispenser, deposit slot) of the service terminal are accomplished by way of one or more applications which are given control over the peripheral(s).

While modernized system designs have brought about changes to the hardware and software architectures of service terminals, it may nevertheless be desired to run applications that are out-of-date or otherwise incompatible with the service terminal's native hardware and/or software architecture.

Virtualization can provide one solution, whereby the application(s) are run within one or more virtual application environments (also referred to as a virtual machine, virtual environment, virtual application environment, guest system, or guest environment). However, virtualization in the service terminal context can be difficult. Known virtualization techniques, such as those applied in enterprise information technology, sometimes fail to provide proper virtualization in service terminals. One reason for such failure is the particularity of the off-the-shelf peripherals used by the service terminals, such as those specialized peripherals mentioned above. When an application for performing a task is activated, the application assumes (by default application design) and expects that it has full access to the necessary peripherals of the service terminal, without competition from other application to access those peripherals. This can be problematic in situations where virtualization is used. When applications run within different virtual environments, logical connections and disconnections are made between the hardware peripherals of the service terminal and the virtual environments and this violates the assumption by an application that the application has an always-on connection to the peripherals.

Attempts to simply create a virtual peripheral within an application's virtual application environment are not an effective solution. For instance, changes may be required to be made to the applications themselves. Existing solutions might require changes to be complaint with some API, for instance, and there may be restrictions on the usage of virtualization to protect the application environment. Semaphores flags (locks) may be needed for proper communication between the virtual peripherals and the hardware peripherals which can necessitate extensive testing in order to minimize risk of deadlock. The operational characteristics of off-the-shelf peripherals are also prohibitive of the virtual peripheral approach. The off-the-shelf peripherals are typically slow due to the interaction with human beings, and may require multiple commands to execute a single operation. And, as noted above, the peripherals are not designed for access by multiple virtual peripherals, thus leading to the undesirable task of redesigning the application(s) of the service terminal to properly handle synchronization (including busy statuses) of the multiple virtual peripherals in accessing a single (hardware) device.

Additionally, moving an application to a platform that is designed for concurrent peripheral access may similarly require that the application be rewritten to fit the platform API requirements. The costs to change an application in such a manner can be expensive and time consuming. Even if the applications are changed, there remains the risk of mutual incompatibility between the applications when placed into the environment, thus demanding a long period of field tests, which further increases the costs and postpones release of the solution, potentially negatively impacting the business associated with the service terminal.

Further details are now provided with regard to the challenges presented by peripheral virtualization in service terminals, in contrast to peripheral virtualization in standard data processing systems. Virtual peripherals work well to virtualize many standard desktop and server peripherals including a keyboard, mouse, network component, and storage unit. With standard peripherals, typically only single commands/messages are exchanged at a time—e.g. when a user presses a key on a keyboard, a 'letter' is sent to the application that is active. The virtual peripheral approach does not work well with some specialized off-the-shelf peripherals of service terminals. With off-the-shelf peripherals, there are typically multiple commands exchanged and if background applications had access to the peripheral, commands from the on-focus and off-focus applications would mix and cause faults in each application.

The service terminal application of a background virtual application environment must not "see" or recognize the peripheral logical disconnection. This is because, as noted, the application believes that the peripheral is always available. A recognized disconnection would normally be handled as a peripheral fault, and, depending on the criticality of the peripheral to that application's functions, the application might stop working with the peripheral (when the peripheral is not critical) or might go into a 'maintenance mode' (when the peripheral is critical).

Furthermore, to serialize standard peripheral access in order to provide synchronized access among multiple applications, virtual peripherals employ software synchronization elements such as semaphores and/or mutexes (mutual exclusion elements) to control which application receives access and when that access is received. However, in service terminals, when the peripherals interact with a service terminal user, the timeout is typically quite high (many seconds) because the peripherals typically have mechanical components that require relatively long periods of time to perform actions (such as accept or dispense cash). Service terminal applications may need to wait several seconds or minutes for the requested operation to be completed, for instance. Thus, the application sends a command and awaits a reply for that duration of time, and the operation concludes once a reply has been received or a (relatively high) timeout has been reached. As a result of the relatively long delays involved in operation completion using off-the-shelf peripherals in service terminals, application problems, bugs, or faulty behaviors will be reflected to the other applications executing thereon. Additionally, since each application is likely using its own software synchronization elements, the risk of deadlock and the potential to crash the service terminal is significant. Deadlock, where two or more competing actions are each waiting for the other to complete (thus nether ever does), is a common problem when mutex elements are used to synchronize software.

Aspects of the present invention address the above through an approach to serializing the accesses by the applications to the service terminal peripherals, thereby creating a transparent process that can work without any changes to the applications.

To facilitate serialized access to the peripherals, peripheral emulators are used in place of direct access between the applications and the peripheral devices of the service terminal. FIG. 1 depicts one example of a service terminal in accordance with one or more aspects of the present invention.

Service terminal 100 includes physical hardware 102 (including one or more processors and standard hardware such as memory (including RAM, ROM, and/or mass storage devices), bus(ses), I/O components, and standard peripherals such as video, keyboard, and network devices) and three off-the-shelf specialized peripheral devices 104, 106, 108. In one example, peripheral device 104 is a thermal printer with a presenter, peripheral device 106 is a pinpad, and peripheral device 108 is a card reader. Executing on physical hardware 102 (e.g. on one or more processors thereof) is a hypervisor 110 (also referred to as a host or a virtual machine manager). Hypervisor 110 manages and enables multiple virtual application environments (virtual machines, guests, or guest environments) 112, 114, 116 to execute concurrently and "on top of" hypervisor 110. The virtual application environments 112, 114, 116 and host 110 are included in memory of hardware 102, in one example.

Support for virtual machines by service terminal 100 provides the ability to operate an arbitrary number of virtual machines, each providing a separate execution environment executing a guest operating system, for instance, and one or more guest applications on each guest operating system. Thus, each virtual application environment 112, 114, 116 is capable of functioning as a separate system. That is, each virtual application environment can be independently reset, host a disparate guest operating system, and operate with different programs. An operating system and/or application program running in a virtual application environment appears to have full access to a full and complete system, but in reality, only controlled access and/or a portion of the system is available.

Shared physical resources of the service terminal 100 (e.g., CPUs, memory, I/O devices, etc. of physical hardware 102) are 'owned' by hypervisor 110, and the shared physical resources are dispatched by hypervisor 110 to virtual application environments 112, 114, 116 as needed. The interactions between the virtual machines and the physical shared machine resources are controlled by hypervisor 110, though the hypervisor may additionally or alternatively simply partition and assign the hardware resources to the configured virtual machines. Hardware 102, including the one or more processors which may be physical processor resources, is assignable to a virtual application environment. For instance, a virtual application environment can represent all or a share of a physical processor (or other hardware) resource that may be dynamically allocated to the virtual application environment. Virtual application environments 112, 114, 116 are managed by hypervisor 110, and hypervisor 110 manages execution of the virtual application environments, including applications executed within/by the virtual application environments. As examples, the hypervisor may be implemented as Type-1 (native), running directly on service terminal hardware, such as on processors of physical hardware 102, or may implemented as Type-2 (hosted), running within a host operating system executing on service terminal 100.

Physical hardware 102 and/or software executing on the one or more processors of hardware 102 may include input/output (I/O) components or interfaces (not pictured) that direct the flow of information between devices and main storage of hardware 102. The I/O components/interfaces relieve the processor(s) of the task of communicating directly with the I/O devices coupled to the service terminal and permit data processing to proceed concurrently with I/O processing, for instance.

In one embodiment, the host hypervisor and processor hardware/firmware interact with each other in a controlled cooperative manner in order to process guest operating system operations without requiring transfer of control from/to the guest operating system and the host. Guest operations can be executed directly without host intervention, in some instances, wherein guest instructions and interruptions are processed directly, until a condition requiring host attention arises.

As used herein, firmware includes the hardware-level instructions and/or data structures used in implementation of higher level machine code. In one embodiment, it includes, for instance, proprietary code that includes trusted software specific to the underlying hardware and controls operating system access to the system hardware.

It can be seen that many different architectures can be virtualized in different virtual application environments executing on top of hypervisor 110. This enables execution of applications designed for different architectures to be executed on service terminal 100, which architecture may be the same or a different architecture than that being virtualized by a virtual application environment. Legacy and out-of-date applications can remain in use through provision of a virtual application environment that virtualizes the necessary architecture for the legacy or out-of-date application to run.

Similarly, instances of a variety of different operating systems designed to run on the same or disparate architectures can be run within different virtual application environments so that even applications designed for the same hardware architecture but different operating systems may be run concurrently and share the physical hardware of the service terminal.

Referring again to FIG. 1, hypervisor 110 controls execution of virtual application environments 112, 114, 116. Virtual application environment 112 includes a variety of components, including one or more application(s) 112*a*, such as an operating system and application(s) executing within the operating system environment, and one or more peripheral emulators 112*b*. Peripheral emulator(s) 112*b* emulate peripherals 104, 106, 108 of service terminal 100. In one example, a separate peripheral emulator is provided for each specialized peripheral of the service terminal. Thus, in the example of FIG. 1, three peripheral emulators 112b may be provided, one for each peripheral 104, 106, 108. Virtual application environments 114 and 116 similarly each include one or more applications (114a and 116a, respectively) and one or more peripheral emulators (114b and 116b, respectively). While only three virtual application environments are shown in FIG. 1, it is understood that there may be a greater or lesser number of virtual application environments running on service terminal 100.

Service terminal 100 also includes a master controller, i.e. master peripheral emulator 118 executing on processor(s) of physical hardware 102, to control (for instance, to serialize) access to peripherals 104, 106, 108 by each virtual application environment 112, 114, 116, via separate peripheral hardware abstraction layers (PHALs) 120, 122, 124, as described in further detail below with respect to FIG. 2.

Figure 2:
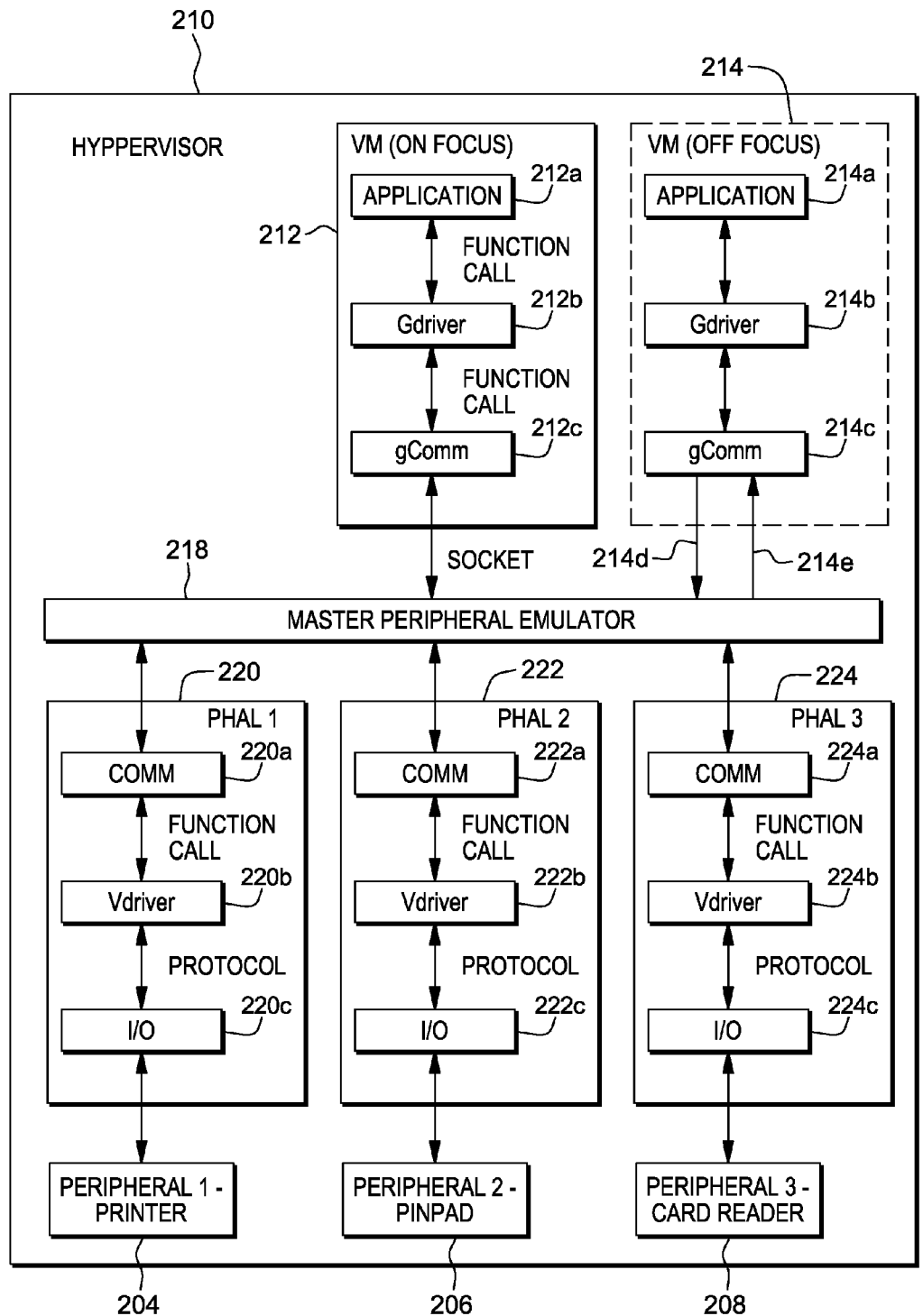
FIG. 2 depicts further details of controlling access to peripherals by multiple applications of a service terminal, in accordance with one or more aspects of the present invention.

FIG. 2 depicts further details of controlling access to peripherals by applications of a service terminal, in accordance with one or more aspects of the present invention. Referring to FIG. 2, there is shown, for purposes of illustration and not limitation, components of a service terminal implementing such control. In particular, shown in FIG. 2 are hypervisor 210 and peripherals 204, 206, 208, which, in this example, are a printer/presenter, pinpad, and card reader, respectively.

Included within hypervisor 210 are virtual machine 212 and virtual machine 214. In one example, virtual machine 212 runs a Windows®-based operating system (offered by Microsoft Corporation, Redmond, Wash., such as Windows® XP) and virtual machine 214 runs a distribution of the Linux® operating system.

Virtual machine 212 includes application 212a that executes a service terminal application on a guest operating system of virtual machine 212, and Gdriver 212b and gComm 212c modules, which are a hardware abstraction layer and command-issuing module, respectively, used for interfacing between application 212a and master peripheral emulator 218. Gdriver 212b communicates, via function call(s) for instance, with application 212a and gComm 212c. gComm 212c receives commands (via functional calls) from the Gdriver 212b and forwards the commands using a socket connection, in this example, to master peripheral emulator 218. In one example, Gdriver 212b and gComm module 212c collectively form a peripheral emulator (e.g. FIG. 1, #112) for emulating peripheral device(s) 204, 206 and/or 208.

Virtual machine 214 similarly includes an application 214a, Gdriver 214b and gComm module 214c that interact with each other and master peripheral emulator 218. In the example of FIG. 2, virtual machine 212 is in the on-focus state and virtual machine 214 is in the off-focus state, which is described further below.

Master peripheral emulator 218 is responsible for controlling access by virtual machines 212 and 214 to each peripheral device 204, 206, 208 by way of controlled access to each peripheral hardware abstraction layer (PHAL) 220, 222, 224, which abstract the peripheral devices 204, 206, 208 respectively. One characteristic of service terminals running multiple applications is that a service terminal user selects an application (directly or indirectly, for instance by selecting an activity that the application performs), and the application becomes activated to perform a task, while the remaining applications run at some 'idle state' in the background. Master peripheral emulator 218 is responsible for serializing accesses to peripherals 204, 206, 208. In one example, master peripheral emulator 218 places an identified (selected) application into an on-focus state, which enables, for the application, access to peripherals 204, 206, 208. Meanwhile, the remaining, i.e. unselected, application(s) are placed by master peripheral emulator 218 into an off-focus state (if not already in the off-focus state), in which access to the peripheral(s) are disabled but master peripheral emulator 218 handles attempts to access the peripheral(s) so that the logical peripheral disconnection (lack of access) is transparent to the applications in the off-focus state.

In one example, when no user is operating the service terminal, the applications of the service terminal are running in the off-focus state. While an application is in an off-focus state, the application does not have direct access to the peripheral(s) of the service terminal. Instead, the peripheral emulator(s) of the virtual machine in which the off-focus application runs pass the access attempts to the master peripheral emulator which simulates connectivity to the real peripheral device(s). When an application in the off-focus state attempts to access a peripheral device, for instance requests/requires some peripheral status, a command (issued by the gComm module, for instance) is passed to the master peripheral emulator and the master peripheral emulator simulates a response to the request. In one example, certain statuses are reported (either in response to a request by an application or automatically by the master peripheral emulator), while others are not. For instance, in the case of a printer, the master peripheral emulator reports if the printer is out of paper, but may not report that the printer is busy or that there is a paper jam. The purpose, in one example, is to preserve the appearance that the peripheral is not being logically disconnected from the application and logically connected to other applications. For instance, if a printer is busy with a request from an on-focus state application and the master peripheral emulator reports a 'printer busy' status to an off-focus state application that assumes it, and only it, has access to the printer, then the off-focus state application may determine there is a fault since it is not expecting the printer to be busy. Another example of such selective reporting of device status is that the master peripheral emulator may report that the cash dispenser is operational, but not if there is presently cash on the output being dispensed.

Thus, commands received by the master peripheral emulator from an application (by way of a peripheral emulator, such as a Gdriver/gComm combination), can be consumed by the master peripheral emulator and held from transmission to the PHALs/peripheral device as an access to the peripheral device. The master peripheral emulator can respond with an appropriate (simulated) response to mask the fact that access to the peripheral(s) is currently disabled for the off-focus state application. Thus, in FIG. 2, virtual machine 214, which is in the off-focus state, issues command(s) 214d to master peripheral emulator, and master peripheral emulator responds 214e appropriately without passing commands 214d along to the PHALs.

In some examples, it is considered a program error for an application that is not currently selected to perform a task to attempt to access a peripheral device. In such cases, a program fault, crash, or the like upon an access attempt that fails (i.e. because the program is not currently performing a task) is normal in that it would occur on a conventional service terminal that does not incorporate aspects of the present invention. Thus, the master peripheral emulator may be configured to emulate the behavior of the conventional system, i.e. to fail to respond to certain commands received from an off-focus state application, or to emulate the response that would have been received on a conventional service terminal.

In these examples, the off-focus state application may fault, crash, or the like, as it would have in the conventional service terminal, and the programming error would be handled as normal, for instance by a developer as part of a debugging process.

As noted above, the applications of the service terminal may all initially be placed into the off-focus state in which access to the peripherals is disabled but simulated by the master peripheral emulator. Then, when a user selects an application on the service terminal, the selected application can be placed into the on-focus state to allow access to the peripheral devices. Logically, then, the application runs as if the selected application was given unfettered control of the peripherals.

An application executing on the service terminal, such as an application executing as part of the hypervisor (and in one particular example, the master peripheral emulator itself) provides a menu to allow a user to select a virtual application environment and/or a specific application with which the user wishes to interact. In the example of an automated teller machine, initially, after an ATM card is inserted into the card reader of the ATM, and the user enters the user's correct PIN, the user may be presented with a graphical user interface having a menu with multiple buttons for selecting different activities. One activity may be to print an account balance, which is associated with one virtual application environment of possibly several virtual application environments of the ATM. Upon selection of the Print Account Balance activity, the virtual application environment corresponding to the Print Account Balance activity may be placed into the on-focus state to allow access to, for instance, the printer peripheral by the Print Account Balance application of the virtual application environment. That application accesses the printer to print the account balance. Thus, an application can be placed into an on-focus or off-focus state by placing the virtual application environment in which it executes into an on-focus or off-focus state.

When the user selects the virtual application environment for performing the printing of the account balance, the user indirectly selects an application for which access to the printer peripheral is to be enabled. Referring to FIG. 2, assume virtual machine 212 is the virtual application environment for the Print Account Balance activity. Virtual machine 212 is in the on-focus state, and, by virtue of the Print Account Balance application 212*a* running in that on-focus application environment, application 212*a* is in the on-focus state, giving access to printer 204 by application 212*a*. Application 212*a* issues a function call to Gdriver 212*b* which initiates (by way of a function call to gComm 212*c*) sending of a command from gComm 212*c* to master peripheral emulator 218. Because that command is from an application in the on-focus state (i.e. application 212*a*), the command is passed to the proper PHAL responsible for I/O communication with the printer, in this case PHAL 220. In one example, the commands sent through a gComm of the on-focus state virtual application environment will be addressed through the master peripheral emulator to the proper PHAL and more specifically to a command module of the proper PHAL. In FIG. 2, Comm module 220*a* of PHAL 220 receives the command. Comm module 220*a* is responsible for translating the command for Vdriver 220*b*. Vdriver 220*b* creates a standard interface used to access the peripheral (in this case printer 204) by way of I/O device/interface 220*c*. I/O device/interface 220*c* includes, for instance, physical hardware (USB, serial port, etc.) and/or software defined by the peripheral for accessing printer 204. Commands may come from various types of virtual application environments and thus may be in different formats and/or request an operation in various different ways. Comm module 220*a* therefore translates the command, if necessary, into a format usable by Vdriver 220*b* and issues the appropriate function call(s) to Vdriver 220*b* for the generic operation (in this case printing the account balance). The Vdriver 220*b* uses a proper I/O port of I/O device/interface 220*c* for effecting the operation. PHALs 222 and 224 similarly include, respectively, Comm modules 222*a* and 224*a*, Vdrivers 222*b* and 224*b*, and I/O devices/interfaces 222*c* and 224*c*, for interacting with Pinpad 206 and Card Reader 208, respectively.

In this manner, selected on-focus state application 212*a* may engage in operational transaction(s) of the service terminal using the specialized peripherals 204, 206, 208. More specifically, the on-focus application can print and present using printer 204, and gather input (using pinpad 206 or card reader 208). The remaining (unselected) virtual application environment 214 having other application 214*a* continues to run in the off-focus state, with master peripheral emulator 218 handling commands from gComm 214*c* by simulating access to the peripherals, making the logical peripheral disconnection totally transparent to the unselected, off-focus state virtual application environment 214 and application 214*a* thereof.

When master peripheral emulator 218 identifies that the application/virtual machines's interaction with the specialized peripherals 204, 206, 208 is terminated (for instance the user exits the activity, closes the application, returns to the main user interface, etc.) the selected application (in FIG. 2, application 212*a*) is placed back into the off-focus state, logically disconnecting application 212*a* and virtual machine 212 from PHALs (220, 222, 224). Peripheral emulation resumes for virtual machine 212 (while continuing for virtual machine 214), and the master peripheral emulator awaits a next selection by a user.

As described above, the master peripheral emulator controls and serializes the access to the specialized peripherals being shared by the virtual machines and applications running therein, keeping the accesses synchronized, even in the case that an off-focus application engages in abnormal behavior by attempting to access a peripheral when not in the on-focus state.

Since a maximum of one application environment is enabled access to the specialized peripherals at any given point in time, access to the specialized peripherals by the applications executing on the service terminal is serialized. Advantageously, usage of a separate synchronization element is avoided, which eliminates the risk associated therewith of application deadlock. Additionally, modification to the applications to account for peripheral connection/disconnection is avoided and the master peripheral emulator can easily segregate an application experiencing programmatic error by setting the application's environment status (i.e. the status of the virtual application environment) as being 'on maintenance'. The master peripheral emulator can then reset the peripheral(s) before allowing subsequent usage of the peripheral(s).

Figure 3:
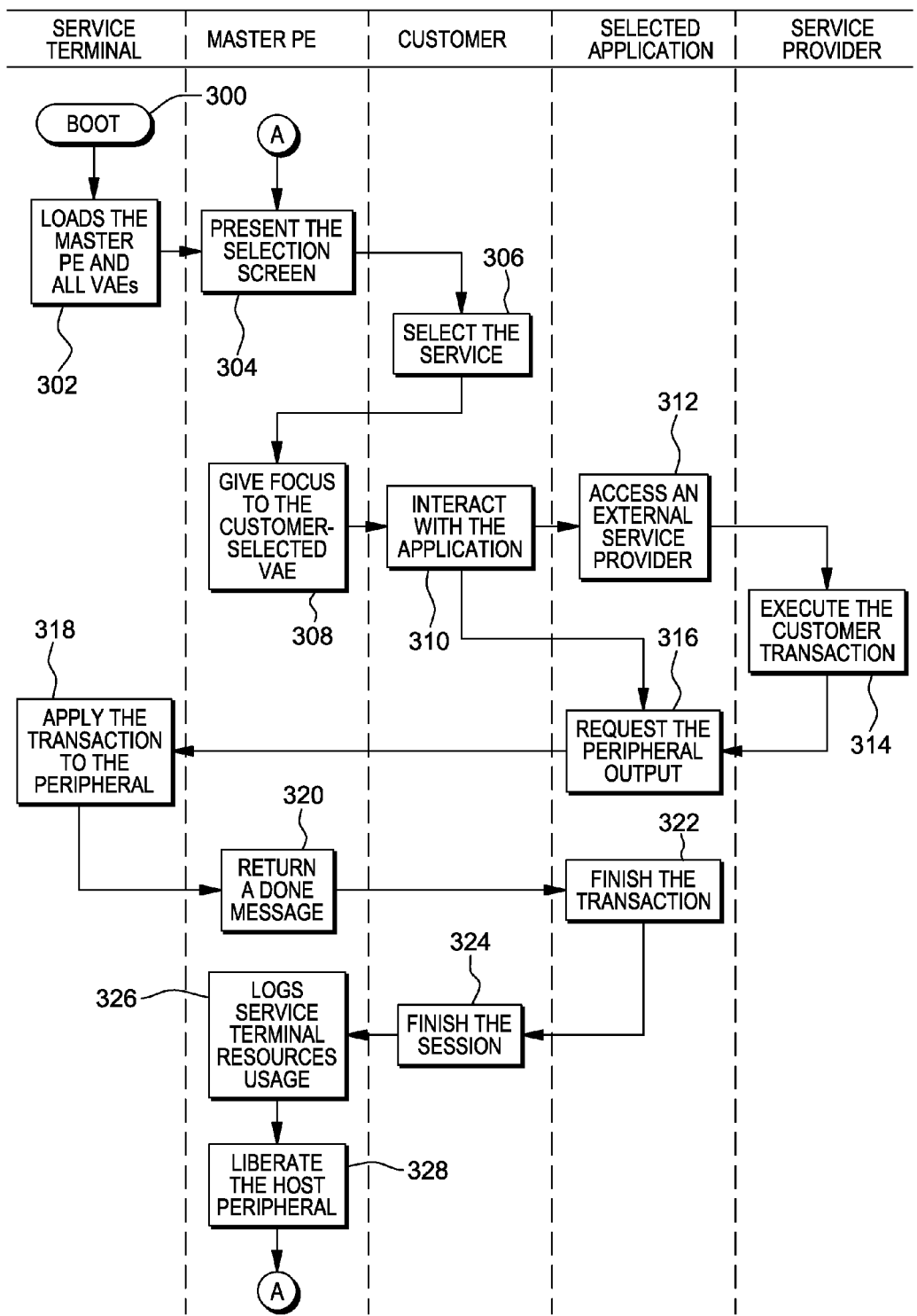
FIG. 3 depicts an example transaction in which controlled access to one or more peripherals is provided, in accordance with one or more aspects of the present invention.

Turning now to FIG. 3, an example transaction is depicted in which controlled access to one or more off-the-shelf peripherals is provided, in accordance with one or more aspects of the present invention. In the example of FIG. 3, the service terminal user is a customer. Initially, the service terminal is booted (300) to initiate system components and begin loading the operating system responsible for executing the master peripheral emulator. In one example, the operating system is a type-1 or type-2 hypervisor. Additionally or alternatively, the loaded operating system replaces a standard shell of the service terminal. Next, the master peripheral emulator (master PE) and the virtual application environments (VAEs) of the service terminal are loaded (302). As part of the loading of the master peripheral emulator and the virtual application environments, the service terminal may perform environment integrity check(s) and abort the boot/load process if one or more checks fail. While loading each virtual application environment, the master peripheral emulator does not allow selection of any virtual application environment by the customer. Each virtual application environment, when loaded, will send a ready status to the master peripheral emulator, which then enables selection and interact capability for the customer. The master peripheral emulator then presents a selection screen on the service terminal (304). The selection screen allows the selection of different services to interact to perform various tasks/activities. The selection screen may also identify the service provider network or display commercial advertising, as examples.

The customer begins a session by selecting (306) a desired service using, for instance, a keyboard of the service terminal or touch-screen interface to select a menu option. In another example, a customer selects a desired service by presenting a special card to a card reader of the service terminal. The preceding are just examples, and selection of a desired service may be accomplished by way of any other available interface provided by the service terminal.

Selection of the service selects a virtual application environment and/or application of a virtual application environment. The master peripheral emulator then gives focus (308) to the customer-selected virtual application environment. As an example, the master peripheral emulator performs the following: (i) identifies the virtual application environment associated with the customer selection (if the customer has selected to perform transaction 1, this is to be performed using virtual application environment A, for instance), (ii) places the corresponding virtual application environment into the on-focus state and presents a representation of the environment on the service terminal screen (such as loads a next screen showing an interface for customer interaction), (iii) enables access to the service terminal's off-the-shelf peripherals by the selected virtual application environment, to enable control thereof by an application of the virtual application environment, for instance, (iv) informs the virtual application environment that a customer has selected/activated the virtual application environment (for instance so the environment can engage the customer to perform the transaction), and (v) enables the customer to begin interaction with the virtual application environment to perform the desired transaction.

Selecting a virtual application environment selects an application for use in performing the transaction. Then, the customer interacts (310) with the selected application to perform the transaction. The customer may interact with the service terminal in a manner defined by the application of the virtual application environment, for instance using a keyboard, touch screen or other standard interface available on the service terminal (the virtual application environment has full control of those peripherals). Example interactions with an application may be selection to purchase goods (such as to confirm rental of a selected DVD); obtain information (such as read information from a supplied smart card); print information (such as a copy of a telephone bill, admission ticket); input a currency amount to withdraw from an account; or any other business transaction available, as examples.

The selected application may be 'self-contained', in that it does not rely on an external service provider to execute the transaction, or it may instead rely on an external service provider for transaction completion. One example of an external service provider is a bank's backend server(s) that commit fund withdrawals to customer accounts. When a customer makes a withdrawal from an ATM, the withdrawal of funds needs to be committed to the customer's account. Instead of storing customer account information at each ATM and committing a withdrawal to a database at the ATM, which would be impractical, the withdrawal may be committed on a backend set of server(s) responsible for maintaining account balances, in which case the ATM reaches out to the bank's backend system to notify the system that a withdrawal of a particular amount of money should be committed to the customer's account.

If the application is not self-contained, the application accesses the appropriate external service provider (312), such as a data center, over a network by, for instance, sending the corresponding transaction request to the external service provider system. The external service provider system analyzes, interprets and validates the transaction request message (fund withdrawal for instance) and, assuming the request is valid, executes the transaction and sends a reply message to the application (314).

In response to receiving the external service provider reply message validating the transaction, or if the application is self-contained, a specific set of peripheral command(s) is generated and peripheral output is requested (316), to fulfill the customer's transaction request. Using the above example of a customer withdrawal, cash is output using the ATM's cash dispenser. Thus, peripheral command(s) are applied through the master peripheral emulator to the service terminal peripheral (318). A proper execution result message is returned (320) to the application, which finishes the transaction (322). An indication of the finished transaction may be presented to the user, for instance. The customer may finish the interaction, for instance by terminating the session (324) with the service terminal in some manner (by logging out, requesting the ATM card back, etc.) or perhaps by selecting a new transaction to be performed.

When the customer's session is finished, the master peripheral emulator logs all the service terminal resource usage by the virtual application environment (which was placed into the on-focus state) (326), for instance for a future billing process. The master peripheral emulator then liberates (328) the service terminal peripheral(s) that were being made available exclusively for access by the selected application by placing the virtual application environment (and therefore the selected application thereof) into the off-focus state while the logical connection to the peripherals is logically disconnected. The master peripheral emulator then returns to 304 to present the selection screen on the service terminal and wait for commencement of a new customer session.

If, during the process of FIG. 3, an attempt is made by an off-focus state application to access one or more peripherals for which access is being controlled by the master peripheral emulator, then, since access to the peripherals by the application is disabled, the master peripheral emulator will block that access attempt to the peripherals by the off-focus state application and emulate the peripheral response, in one example, returning the proper result message to the application, but without actually sending the command(s) to the peripheral.

Figure 4:
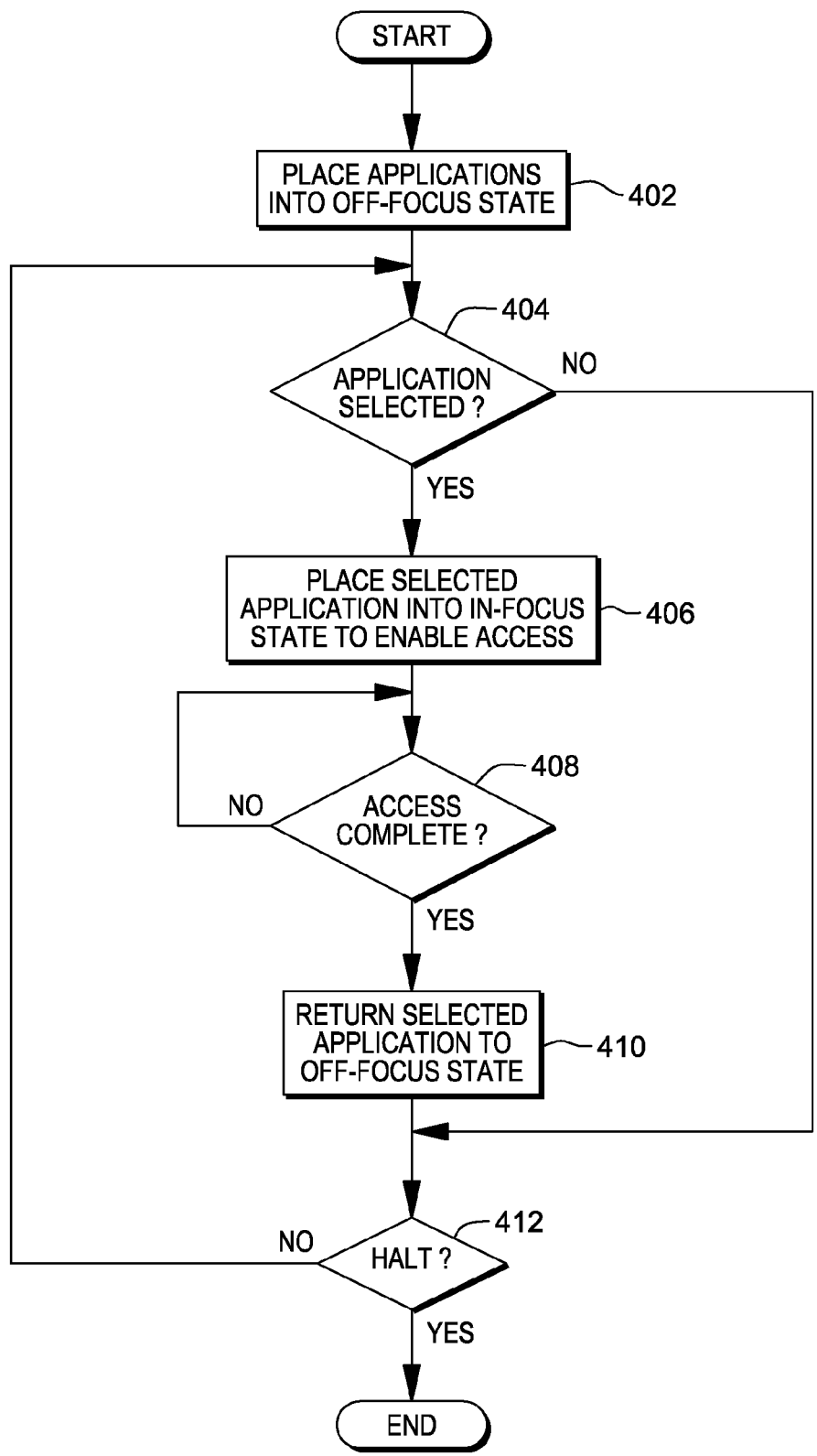
FIG. 4 depicts one example of a process for managing access to one or more peripherals of a service terminal, in accordance with one or more aspects of the present invention.

By the above, managed access to one or more peripherals of a service terminal is provided. An example process for managed access to one or more peripherals, such as one or more off-the-shelf peripherals of a service terminal, is now presented with reference to FIG. 4. In one example, a master controller, such as master peripheral emulator of a hypervisor, performs the process of FIG. 4. The process begins by placing applications of a service terminal into an off-focus state (402) in which the master controller simulates connectivity to the peripheral(s) for the applications and in which access to the peripheral(s) is disabled transparent to the applications. In one particular example, this is accomplished by placing each virtual application environment (in which the applications execute) into the off-focus state described above.

Once the applications are placed into the off-focus state, the master controller can control access to those peripheral(s) by the applications such that only one application of those applications can access the peripheral(s) at a time. Specifically, it is determined whether an application has been selected (404), i.e. identified for placement into an on-focus state in order to enable access to the peripheral(s) by the selected application. If an application has not yet been selected, it is determined whether the process is to halt (412), and assuming the process is not to halt, then the process loops to again determine whether an application has been selected. In this manner, the process loops until either an application has been selected, or the process halts.

At 404, when it is determined that an application has been selected for placement into the on-focus state, for instance responsive to selection by a user to perform a task or transaction using the service terminal, the master controller places the selected application into the on-focus state (406) to enable access to the peripheral(s) by the application. In one example, this is accomplished by placing the virtual application environment in which the selected application executes into the on-focus state. While the access to the peripheral(s) by the selected application is enabled, the remaining applications remain in the off-focus state. In the off-focus state, access to the peripheral(s) by the remaining applications is disabled. However, this disablement is transparent to the remaining applications because the master controller is simulating connectivity to the peripheral(s) for those applications. Thus, the master controller will, in one example, respond appropriately to a command issued by an off-focus application, without passing that command to the peripheral device, so that the off-focus application is unaware that its access to the peripheral device is disabled.

After the selected application is placed into the on-focus state, it may (though is not required to) access the one or more of the peripheral(s). The master controller loops by determining whether access is complete (408). At some point, such as when a user exits the application, completes a transaction, or upon a timeout, the master controller determines that access to the peripherals by the selected application is complete and returns the selected application to the off-focus state (410), for instance by returning the virtual application environment in which the selected application executes back into the off-focus state.

It is then determined whether the process is to halt (412), for instance based on the service terminal receiving a shutdown or logout signal. If so, the process ends. However, if no halt signal is received, then the process returns to 404 where the loop begins again. By looping, the selection of an application, the placement of that application into the on-focus state to enable access to the peripheral(s), and then the return of the application to the off-focus state can repeat for another (or the same) application, and this can repeat indefinitely. The process thereby serializes accesses being made to the peripheral(s) by the applications executing on the service terminal based on selection of applications for performing service terminal tasks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 5:
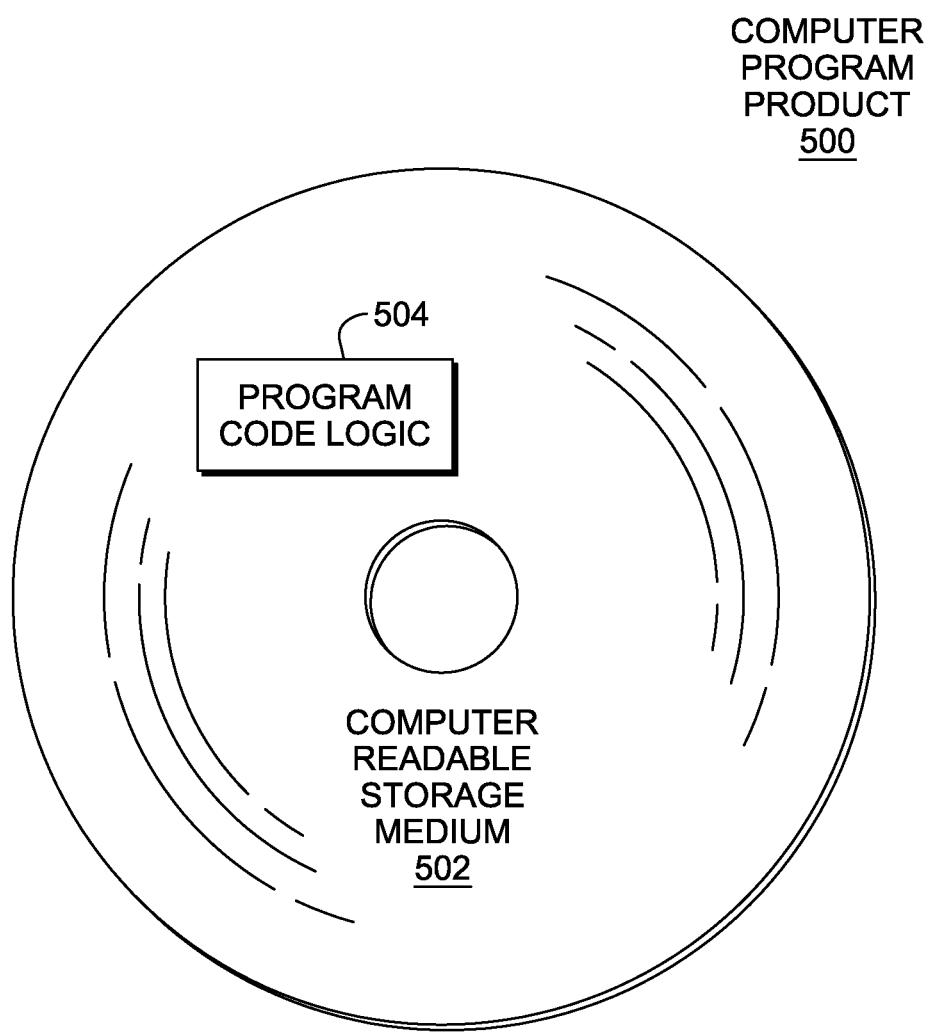
FIG. 5 depicts one embodiment of a computer program product incorporating one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/ or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing access to one or more peripherals of a service terminal, the method comprising:
   controlling, by a master controller executing on at least one processor of the service terminal, access to the one or more peripherals by multiple applications executing on the service terminal, wherein only a single application of the multiple applications is enabled access to the one or more peripherals at a time, and wherein the multiple applications are each configured expecting full and continuous access to the one or more peripherals during run-time of the multiple applications, and wherein the controlling comprises:
      identifying an application of the multiple applications for placing into an on-focus state in order to enable access to the one or more peripherals by the identified application;
      placing the identified application into the on-focus state, wherein access to the one or more peripherals by the identified application is enabled to enable control of the one or more peripherals by the identified application through commands sent to and from the one or more peripherals; and
      wherein the remaining applications of the multiple applications execute in an off-focus state in which the master controller simulates, for the remaining applications, connectivity to the one or more peripherals, and in which access to the one or more peripherals by the remaining applications is disabled transparent to the remaining applications while the access to the one or more peripherals by the identified application is enabled, wherein the remaining applications expect full and continuous access to the one or more peripherals while executing in the off-focus state, and wherein the master controller simulates connectivity to the one or more peripherals for an application of the remaining applications by simulating a response to a command made by the application of the remaining applications to at least one peripheral of the one or more peripherals.

2. The method of claim 1, wherein the method further comprises initially placing the multiple applications into the off-focus state, wherein placing the identified application into the on-focus state temporarily places the identified application into the on-focus state to enable access to the one or more peripherals by the application, and wherein the controlling further comprises placing the identified application back into the off-focus state based on the identified application completing access to the one or more peripherals.

3. The method of claim 2, wherein the controlling further comprises repeating the identifying, the placing into the on-focus state, and the placing back into the off-focus state for at least one other application of the multiple applications, thereby serializing the access being made to the one or more peripherals.

4. The method of claim 1, wherein the multiple applications each execute in a respective different virtual machine of multiple virtual machines executing on the service terminal, each virtual machine of the multiple virtual machines providing a separate execution environment executing a guest operating system, wherein execution of the multiple virtual machines is controlled by a hypervisor, and wherein the master controller comprises a master peripheral emulator of the hypervisor, the master peripheral emulator controlling access to the one or more peripherals by controlling access by the multiple virtual machines to one or more virtual drivers through which access to the one or more peripherals is provided.

5. The method of claim 4, wherein the master peripheral emulator enables access to the one or more peripherals by the identified application by enabling access to the one or more peripherals by the virtual machine in which the identified application executes.

6. The method of claim 4, wherein the identified application is associated with one or more peripheral emulators of the respective virtual machine in which the identified application executes, the one or more peripheral emulators emulating the one or more peripherals for the identified application, and wherein access to the one or more peripherals by the identified application is made through the one or more peripheral emulators via one or more commands sent to the master peripheral emulator.

7. The method of claim 6, wherein the hypervisor further comprises one or more abstraction layers for the one or more peripherals, and wherein enabling access to the or more peripherals comprises enabling passage of the one or more commands to the one or more abstraction layers.

8. The method of claim 1, wherein the identified application is identified based on selection of the identified application by a user of the service terminal.

9. The method of claim 8, wherein the multiple applications execute in the off-focus state, wherein the master controller presents a selection interface to the user for selection by the user of one application from the multiple applications for performing a task associated with the one application, and wherein the selected one application is identified and placed into the on-focus state based on selection thereof by the user, wherein the remaining applications remain executing in the off-focus state.

10. The method of claim 1, wherein the one or more peripherals comprise at least one of a group comprising: a printer and presenter, a pinpad, a card reader, a biometric reader, a bar code reader, a currency acceptor and dispenser, or a card reader.

11. A computer system comprising:
a memory;
one or more peripherals; and
a processor in communications with the memory, wherein the computer system is configured to perform:
controlling, by a master controller executing on the processor, access to the one or more peripherals by multiple applications executing on the computer system, wherein only a single application of the multiple applications is enabled access to the one or more peripherals at a time, and wherein the multiple applications are each configured expecting full and continuous access to the one or more peripherals during run-time of the multiple applications, and wherein the controlling comprises:
identifying an application of the multiple applications for placing into an on-focus state in order to enable access to the one or more peripherals by the identified application;
placing the identified application into the on-focus state, wherein access to the one or more peripherals by the identified application is enabled to enable control of the one or more peripherals by the identified application through commands sent to and from the one or more peripherals; and
wherein the remaining applications of the multiple applications execute in an off-focus state in which the master controller simulates, for the remaining applications, connectivity to the one or more peripherals, and in which access to the one or more peripherals by the remaining applications is disabled transparent to the remaining applications while the access to the one or more peripherals by the identified application is enabled, wherein the remaining applications expect full and continuous access to the one or more peripherals while executing in the off-focus state, and wherein the master controller simulates connectivity to the one or more peripherals for an application of the remaining applications by simulating a response to a command made by the application of the remaining applications to at least one peripheral of the one or more peripherals.

12. The computer system of claim 11, wherein the computer system is further configured to perform initially placing the multiple applications into the off-focus state, wherein placing the identified application into the on-focus state temporarily places the identified application into the on-focus state to enable access to the one or more peripherals by the application, and wherein the controlling further comprises placing the identified application back into the off-focus state based on the identified application completing access to the one or more peripherals.

13. The computer system of claim 12, wherein the controlling further comprises repeating the identifying, the placing into the on-focus state, and the placing back into the off-focus state for at least one other application of the multiple applications, thereby serializing the access being made to the one or more peripherals.

14. The computer system of claim 11, wherein the multiple applications execute in the off-focus state, wherein the master controller presents a selection interface to a user of the computer system for selection by the user of an application from the multiple applications executing in the off-focus state for performing a task associated with the selected application, wherein the identified application is identified based on the user selecting the identified application using the selection interface and wherein the selected application is placed into the on-focus state based on selection thereof by the user, wherein the remaining applications remain executing in the off-focus state.

15. A computer program product for managing access to one or more peripherals of a service terminal, the computer program product comprising:

a non-transitory storage medium readable by a processor and storing instructions for execution by the processor to perform a method comprising:

controlling, by a master controller, access to the one or more peripherals by multiple applications executing on the service terminal, wherein only a single application of the multiple applications is enabled access to the one or more peripherals at a time, and wherein the multiple applications are each configured expecting full and continuous access to the one or more peripherals during run-time of the multiple applications, and wherein the controlling comprises:

identifying an application of the multiple applications for placing into an on-focus state in order to enable access to the one or more peripherals by the identified application;

placing the identified application into the on-focus state, wherein access to the one or more peripherals by the identified application is enabled to enable control of the one or more peripherals by the identified application through commands sent to and from the one or more peripherals; and wherein the remaining applications of the multiple applications execute in an off-focus state in which the master controller simulates, for the remaining applications, connectivity to the one or more peripherals, and in which access to the one or more peripherals by the remaining applications is disabled transparent to the remaining applications while the access to the one or more peripherals by the identified application is enabled, wherein the remaining applications expect full and continuous access to the one or more peripherals while executing in the off-focus state, and wherein the master controller simulates connectivity to the one or more peripherals for an application of the remaining applications by simulating a response to a command made by the application of the remaining applications to at least one peripheral of the one or more peripherals.

16. The computer program product of claim 15, wherein the method further comprises initially placing the multiple applications into the off-focus state, wherein placing the identified application into the on-focus state temporarily places the identified application into the on-focus state to enable access to the one or more peripherals by the application, and wherein the controlling further comprises placing the identified application back into the off-focus state based on the identified application completing access to the one or more peripherals.

17. The computer program product of claim 16, wherein the controlling further comprises repeating the identifying, the placing into the on-focus state, and the placing back into the off-focus state for at least one other application of the multiple applications, thereby serializing the access being made to the one or more peripherals.

18. The computer program product of claim 15, wherein the multiple applications execute in the off-focus state, wherein the master controller presents a selection interface to a user of the service terminal for selection by the user of an application from the multiple applications executing in the off-focus state performing a task associated with the selected application, wherein the identified application is identified based on the user selecting the identified application using the selection interface and wherein the selected application is placed into the on-focus state based on selection thereof by the user, wherein the remaining applications remain executing in the off-focus state.

* * * * *